United States Patent [19]

O'Connell et al.

[11] Patent Number: 5,743,646
[45] Date of Patent: Apr. 28, 1998

[54] TEMPERATURE SENSOR WITH IMPROVED THERMAL BARRIER AND GAS SEAL BETWEEN THE PROBE AND HOUSING

[75] Inventors: David Peter O'Connell, Canfield, Ohio; Randall Christian Sumner, New Wilmington, Pa.

[73] Assignee: General Motors Corporation, Detroit, Mich.

[21] Appl. No.: 675,312

[22] Filed: Jul. 1, 1996

[51] Int. Cl.$^6$ .............................. G01K 1/08; G01K 13/02
[52] U.S. Cl. ................................. 374/148; 374/208
[58] Field of Search ............................. 374/163, 179, 374/148, 208

[56] References Cited

U.S. PATENT DOCUMENTS

| | | | |
|---|---|---|---|
| 2,631,220 | 3/1953 | Barsby | 374/179 |
| 3,232,794 | 2/1966 | Korton | 374/179 |
| 3,580,078 | 5/1971 | MacKenzie | 374/179 |
| 3,598,380 | 8/1971 | Jilek et al. | 374/179 |
| 3,813,944 | 6/1974 | Ryntz, Jr. et al. | 374/179 |
| 4,018,624 | 4/1977 | Rizzolo | 374/179 |
| 4,416,553 | 11/1983 | Huebscher | 374/179 |
| 4,450,315 | 5/1984 | Waterman | 374/208 |
| 4,485,263 | 11/1984 | Itoyama et al. | 374/208 |
| 4,934,831 | 6/1990 | Volbrecht | 374/179 |
| 5,329,806 | 7/1994 | McClanahan et al. | 73/31.05 |

*Primary Examiner*—G. Bradley Bennett
*Attorney, Agent, or Firm*—Anthony Luke Simon

[57] ABSTRACT

A temperature sensor comprising: a hollow tube with a first end and a second end, wherein the second end is closed sealing a cavity within the tube from an environment outside of the tube and wherein the first end has an exterior cylindrical surface; a temperature responsive sensing element within the tube proximate to the second end; a glass cylinder having an inner cylindrical surface in sealing engagement with the exterior cylindrical surface of the first end of the tube; and a sensor housing having an inner cylindrical cavity bounded by an inner cylindrical wall, wherein an outer cylindrical surface of the glass cylinder is sealingly engaged with the inner cylindrical wall.

10 Claims, 1 Drawing Sheet

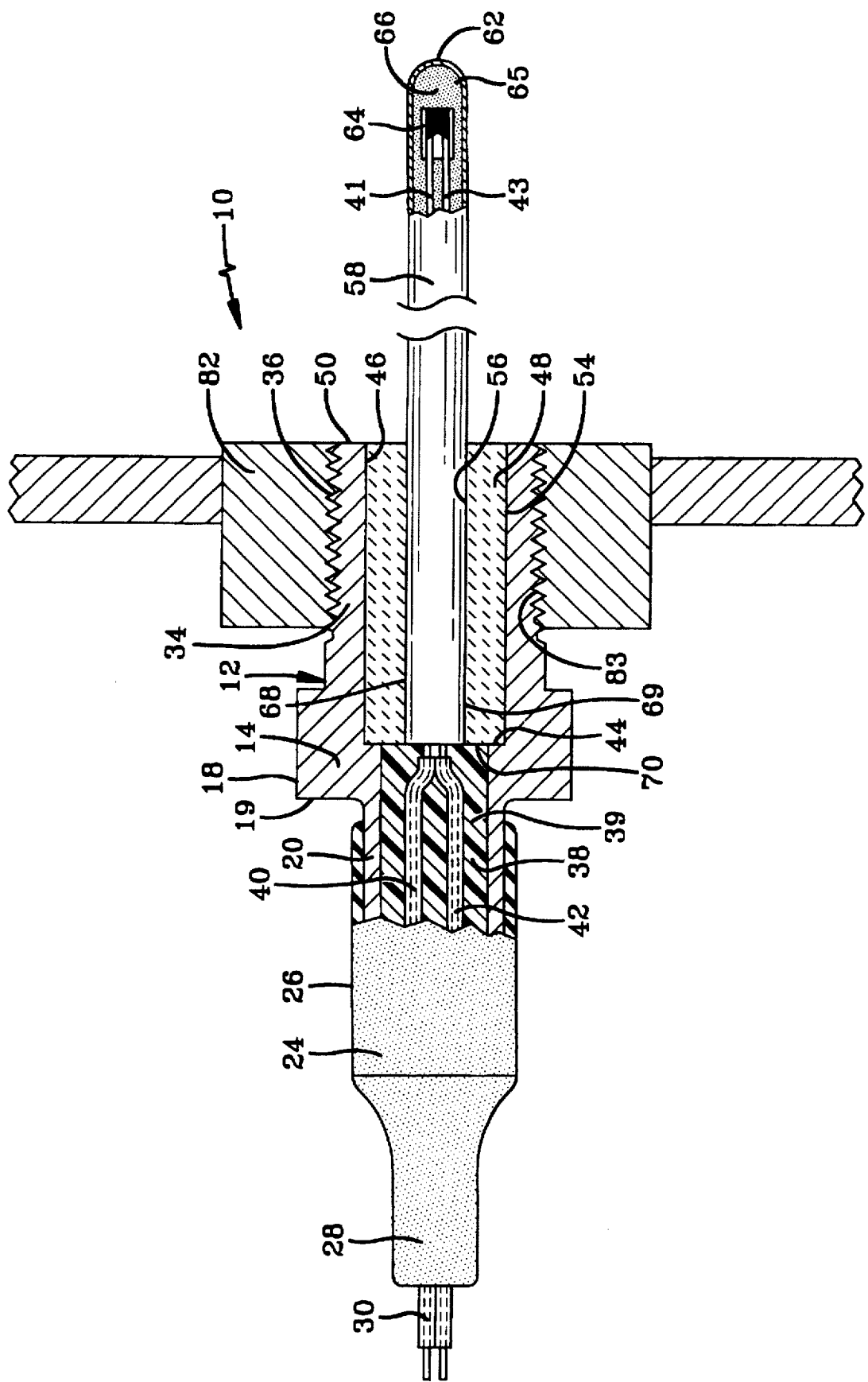

TEMPERATURE SENSOR WITH IMPROVED THERMAL BARRIER AND GAS SEAL BETWEEN THE PROBE AND HOUSING

The invention herein described was made in the course of work under a contract or subcontract thereunder with the Department of Energy. The Government of the United States of America has rights in this invention pursuant to Contract No. DE-AC0290CH10435 awarded by the U.S. Department of Energy.

This invention relates to a temperature sensor.

BACKGROUND OF THE INVENTION

In high temperature environments, temperature sensing is often accomplished with a probe, for example, mounted in a metal housing and inserted through an opening into a chamber containing the high temperature environment. The opening is provided with threads for threadably engaging the housing, allowing the housing to be fixed in place within the threaded opening, maintaining the probe within the chamber. Such sensors may be used to measure gas temperature in automotive exhaust systems or in fuel cell subsystems used to generate electric power.

SUMMARY OF THE PRESENT INVENTION

Advantageously, this invention provides a sensor suitable for determining the temperature of automotive exhaust gas.

Advantageously, this invention provides a temperature sensor that achieves improved thermal isolation of the sensing probe, allowing implementation of a shorter probe and reducing the risk of damage due to probe vibration. More particularly, the temperature sensor structure provided according to this invention provides a thermal barrier between the probe and the housing of the sensor preventing a high flow of heat from the probe to the housing of the sensor and therefrom to the wall of the chamber within which the gas temperature is being measured.

Advantageously, the thermal barrier eliminates the necessity of longer probes to thermally isolate the end of the probe, where the temperature sensing element is located, from the sensor housing and other paths for heat draw. By eliminating the necessity of the longer probes, this invention reduces the design challenge to the temperature sensor that occurs when the sensor is placed in an environment, such as an automotive vehicle engine environment, subject to vibration that can cause structural fatigue of the probe.

Advantageously, this invention overcomes other challenges that occur when heat is readily conducted from the probe through the housing. For example, such heat flow may impair the accuracy of the probe and calibration may be more difficult as the accuracy and calibration would need to take into account the rapid escape of heat from the sensing end of the probe. Further, such heat flow may impair the response time of the probe because it gives the probe a higher effective thermal mass.

According to a preferred example, the above challenges are overcome and the above advantages are achieved in a temperature sensor comprising: a hollow tube with a first end and a second end wherein the second end is closed sealing a cavity within the tube from an environment outside of the tube and wherein the first end has an exterior cylindrical surface; a temperature-responsive sensing element within the tube proximate to the second end; a glass cylinder having an inner cylindrical surface in sealing engagement with the exterior cylindrical surface of the first end of the tube; and a sensor housing defining a cylindrical cavity bounded by an inner cylindrical wall wherein an outer cylindrical surface of the glass cylinder is sealingly engaged with the inner cylindrical wall.

Through this advantageous design, the glass cylinder is incorporated as a structural member maintaining the tube with the sensing element in place with respect to the housing, providing a seal between the tube and the housing and providing a thermal barrier for heat that would otherwise travel from the probe end of the tube, down the tube and through the sensor housing.

BRIEF DESCRIPTION OF THE DRAWINGS

The present invention will now be described by way of example with reference to the single FIGURE, which illustrates an example temperature sensor according to this invention.

DETAILED DESCRIPTION OF THE INVENTION

Referring now to the FIGURE, the temperature sensor 10 shown includes a housing 12 having a thick body portion 14, the outer periphery of which defines a hexagonal surface 18 suitable for receipt of a wrench or similar tool. The wrench or similar tool is used for tightening the threaded portion 36 into a threaded receptacle such as cylinder 82 with threads 83 for engaging the threads 36 on the exterior of the tubular portion 34 of housing 12.

At the end of the body portion 14 opposite the tubular portion 34, a wall 19 projects radially inward following the thinning of the housing 12 to tubular portion 20 extending opposite the direction of tubular portion 34 from the body portion 14. The tubular portion 20 defines a hollow cavity 38 within which wires 40 and 42 attach to leads 41 and 43 from the sensing element 64. Wires 40 and 42 form cable 30, for example, by heat shrinking a polyolefin tubing around the wires 40 and 42, and provide electrical coupling between the sensing element 64 and appropriate circuitry and/or a controller.

The wires 40, 42 and cavity 38 are sealed by a material such as a high temperature epoxy 39 that is injected into cavity 38 and allowed to cure therein. Such epoxy must be capable of withstanding the high temperatures to which the housing 12 of the sensor 10 will be exposed. An example suitable epoxy is Stycast™ Epoxy Resin available from Grace Specialty Polymers.

An additional environmental protection of the interface between the wires 40 and 42 and the tubular portion 20 of the housing 12 is provided through a heat-shrinkable polyolefin sleeve 24 that has a first end 26 wrapping around the tube extension 20 and a second end 28 with a smaller diameter that wraps around the wires 40 and 42. Such polyolefin sleeves are well known to those skilled in the art and may be heat-shrunk in a known manner to form onto the wires 40 and 42 and housing 12 as shown.

The temperature-responsive sensing element 64 is provided in the cavity 65 within hollow tube 58, proximate to the closed end 62. The remainder of the tube 58 forms an extending cylinder and the end 70 opposite the closed end 62 terminates within the housing 12 in the cylindrical cavity formed by the tube extension 34. The outer cylindrical surface 68 of the tube 58 close to the end 70 is in sealing engagement with a circular glass cylinder 48 over a predetermined axial length, as shown. The glass cylinder 48 is located within the cavity formed by the cylindrical tube extension 34 and has an end 52 abutting against annular seat 44 formed within the housing 12 where the inner cylindrical cavity widens to the diameter that extends from the seat 44 to the end 50 of the housing 12.

The outer cylindrical surface 54 of the glass cylinder 48 is sealingly engaged with the inner cylindrical surface 46 of the tube extension 34 of the housing 12. The sealing engagements of the glass cylinder 48 to the tube 58 and housing 12 may be achieved by assembling the housing 12, glass cylinder 48 and tube 58 together and treating the assembly in a furnace that reaches temperatures above the melting point of the glass cylinder 48. The assembly of the housing 12, glass cylinder 48 and tube 58 is then cooled during which process the glass cylinder 48 solidifies in sealing contact with the inner surface 56 of the tubular portion 34 of the housing 12 and the outer surface 68 of the end 70 of the tube 58. The glass cylinder 48 also seals to the annular seat 44.

In an example construction, the tube 58 is made of 316 stainless steel with the tubular walls having a thickness of 0.254 mm, an outer diameter of 2.381 mm and an overall length of 90 mm. The sensing element 64, for example, a platinum thin-film resistive device of a known type having an impedance output responsive to temperature, is placed within the tube 58, which is then filled with a ceramic powder surrounding the sensing element 64 and substantially preventing free movement thereof within the tube 58.

In an alternative example construction, the sensing element 64 is fitted within a ceramic tube (not shown) of a known type that fits within tube 58. The ceramic tube is long enough to hold the sensing element 64 and connections to lead wires 41 and 43. A ceramic paste fills the ceramic tube, maintaining the sensing element 64 in place and providing efficient heat transfer for fast response of sensing element 64.

Example material for the glass cylinder 48 is 9010 glass, available from Corning, and the glass cylinder has an example length of 12 mm and outer diameter of 6.35 mm. It is desirable that the coefficient of thermal expansions of the glass cylinder 48, tube 58 and housing 12 match each other as closely as possible. Thus, when the tube 58 is constructed of 316 stainless steel, the sensor housing 12 is also preferable constructed of 316 stainless steel, and the coefficient of thermal expansion of 316 stainless steel is used in selecting the material for the glass cylinder 48.

We claim:

1. A temperature sensor comprising:

a hollow tube with a first end and a second end, wherein the second end is closed sealing a sensing cavity within the hollow tube from an environment outside of the hollow tube and wherein the first end has an exterior cylindrical surface;

a temperature responsive sensing element within the hollow tube proximate to the second end;

a glass cylinder having an inner cylindrical surface in sealing engagement with the exterior cylindrical surface of the first end of the hollow tube; and a sensor housing having a first housing cavity bounded by an inner cylindrical wall, wherein an outer cylindrical surface of the glass cylinder is sealingly engaged with the inner cylindrical wall, wherein the sealing engagements of the inner cylindrical surface to the hollow tube and the outer cylindrical surface to the inner cylindrical wall maintain the hollow tube in place, wherein gas cannot flow between the glass cylinder and the hollow tube, wherein gas cannot flow between the glass cylinder and the sensor housing and wherein the glass cylinder thermally isolates the hollow tube from the sensor housing.

2. A temperature sensor according to claim 1, wherein the sensor housing includes a means, on an exterior surface thereof, for engaging a receptacle.

3. A temperature sensor according to claim 1, wherein gas cannot flow between the glass cylinder and the tube and wherein gas cannot flow between the glass cylinder and the sensor housing.

4. A temperature sensor according to claim 1, wherein the sensing cavity contains a material in powder form surrounding the sensing element.

5. A temperature sensor according to claim 4, wherein the material comprises a ceramic.

6. A temperature sensor according to claim 1, wherein the first housing cavity extends from a first end of the sensor housing to an inner annular seat against which the glass cylinder abuts.

7. A temperature sensor according to claim 6, wherein the sensor housing also comprises a second housing cavity extending from the annular seat to a second end of the sensor housing opposite the first end.

8. A temperature sensor according to claim 7 also comprising a sealing material substantially filling the second housing cavity.

9. A temperature sensor according to claim 1, wherein the first end of the hollow tube includes a seal comprising one member of a group comprising glass and epoxy.

10. A temperature sensor comprising:

a housing having a first housing end, a second housing end, a cylindrical cavity extending therethrough and an annular seat having a radially directed wall within the cylindrical cavity;

a hollow tube with a closed end and an open end, wherein the open end is located within the housing and the closed end extends out of the housing;

a temperature-responsive sensing element within the closed end of the hollow tube; and a glass cylinder within the housing, wherein the glass cylinder sealingly engages an exterior cylindrical surface of the hollow tube proximate to the open end thereof, sealingly engages a cylindrical wall of the cylindrical cavity and abuts and sealingly engages with the annular seat to maintain the hollow tube in place, wherein gas cannot flow between the glass cylinder and the hollow tube, wherein gas cannot flow between the glass cylinder and the housing and wherein the glass cylinder thermally isolates the hollow tube from the housing.

\* \* \* \* \*